United States Patent
Takehara et al.

(10) Patent No.: US 6,292,206 B1
(45) Date of Patent: Sep. 18, 2001

(54) IMAGE FORMING APPARATUS AND METHOD OF PRODUCING LIGHT QUANTITY CORRECTION DATA

(75) Inventors: Atsushi Takehara; Katsuhiko Maeda, both of Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/220,449

(22) Filed: Dec. 24, 1998

(30) Foreign Application Priority Data

Dec. 26, 1997 (JP) .................................................. 9-359418
Apr. 3, 1998 (JP) .................................................. 10-91503
Aug. 26, 1998 (JP) ............................................... 10-239925

(51) Int. Cl.[7] .............................. B41J 2/385; G03G 13/04
(52) U.S. Cl. ......................... 347/133; 347/130; 347/236; 347/238
(58) Field of Search ................................... 347/236, 238, 347/133, 131, 130

(56) References Cited

U.S. PATENT DOCUMENTS

| | | | |
|---|---|---|---|
| 4,443,695 | * | 4/1984 | Kitamura ........................ 347/133 X |
| 4,897,672 | * | 1/1990 | Horiuchi et al. ..................... 347/236 |
| 5,016,027 | * | 5/1991 | Uebbing ............................... 347/236 |
| 5,812,892 | * | 9/1998 | Miyoshi et al. ................. 347/236 X |

FOREIGN PATENT DOCUMENTS

| | | | |
|---|---|---|---|
| 59-175174 | * | 10/1984 | (JP) . |
| 59-194875 | * | 11/1984 | (JP) . |
| 61-173572 | * | 8/1986 | (JP) . |
| 63-5970 | * | 1/1988 | (JP) ..................................... 347/236 |
| 63-65418 | * | 3/1988 | (JP) . |
| 1-209165 | * | 8/1989 | (JP) ..................................... 347/133 |
| 4-97863 | * | 3/1992 | (JP) . |
| 4-293074 | * | 10/1992 | (JP) . |
| 5-211595 | * | 8/1993 | (JP) . |
| 6-87238 | * | 3/1994 | (JP) . |

* cited by examiner

Primary Examiner—Susan S. Y. Lee
(74) Attorney, Agent, or Firm—Oblon, Spivak, McClelland, Maier & Neustadt, P.C.

(57) ABSTRACT

An electrophotographic image forming apparatus including an LED (Light Emitting Diode) array head and a method of generating data for correcting the quantities of light to issue form the LEDs of the LED array head are disclosed. Only the quantity of light that actually contributes to development is uniformed throughout the LEDs. This reduces the scatter of a dot area in a latent image and thereby enhances image quality while insuring the sufficient resolution of the LEDs.

16 Claims, 7 Drawing Sheets

Fig. 8

| 0 | 0 | 0 | 0 | 0 | 1 | 1 | 1 | 1 | 1 | 1 | 1 | 1 | 1 | 1 | 1 | 1 | 1 | 1 | 1 | 0 | 0 | 0 | 0 | 0 | 0 | 0 |
|---|---|---|---|---|---|---|---|---|---|---|---|---|---|---|---|---|---|---|---|---|---|---|---|---|---|---|
| 0 | 0 | 0 | 1 | 1 | 1 | 1 | 1 | 2 | 2 | 2 | 2 | 2 | 2 | 2 | 1 | 1 | 1 | 1 | 1 | 0 | 0 | 0 | 0 | 0 | 0 | 0 |
| 0 | 1 | 1 | 1 | 1 | 1 | 1 | 2 | 2 | 2 | 3 | 3 | 3 | 3 | 2 | 2 | 2 | 1 | 1 | 1 | 1 | 0 | 0 | 0 | 0 | 0 | 0 |
| 0 | 1 | 1 | 1 | 1 | 1 | 2 | 2 | 3 | 3 | 3 | 3 | 3 | 3 | 3 | 3 | 2 | 2 | 1 | 1 | 1 | 1 | 0 | 0 | 0 | 0 | 0 |
| 0 | 1 | 1 | 1 | 2 | 2 | 3 | 3 | 3 | 3 | 4 | 4 | 4 | 3 | 3 | 3 | 2 | 2 | 1 | 1 | 1 | 1 | 1 | 0 | 0 | 0 | 0 |
| 1 | 1 | 1 | 2 | 2 | 3 | 3 | 4 | 4 | 4 | 4 | 4 | 4 | 4 | 3 | 3 | 2 | 2 | 1 | 1 | 1 | 1 | 0 | 0 | 0 | 0 | 0 |
| 1 | 1 | 1 | 2 | 2 | 3 | 3 | 4 | 4 | 5 | 5 | 5 | 5 | 4 | 4 | 3 | 3 | 2 | 2 | 1 | 1 | 1 | 1 | 0 | 0 | 0 | 0 |
| 1 | 1 | 1 | 2 | 2 | 3 | 3 | 4 | 4 | 5 | 5 | 6 | 6 | 5 | 5 | 4 | 4 | 3 | 3 | 2 | 2 | 1 | 1 | 1 | 1 | 0 | 0 |
| 1 | 1 | 2 | 2 | 3 | 3 | 4 | 4 | 5 | 5 | 6 | 6 | 6 | 6 | 5 | 5 | 5 | 4 | 4 | 3 | 3 | 2 | 2 | 1 | 1 | 0 | 0 |
| 1 | 1 | 2 | 2 | 3 | 3 | 4 | 4 | 5 | 6 | 6 | 6 | 7 | 6 | 6 | 6 | 5 | 4 | 4 | 3 | 3 | 2 | 2 | 1 | 1 | 0 | 0 |
| 1 | 1 | 2 | 2 | 3 | 3 | 4 | 5 | 5 | 6 | 7 | 7 | 8 | 7 | 7 | 6 | 5 | 5 | 4 | 4 | 3 | 2 | 2 | 1 | 1 | 0 | 0 |
| 1 | 2 | 2 | 3 | 3 | 4 | 4 | 5 | 5 | 6 | 7 | 8 | 9 | 8 | 7 | 6 | 6 | 5 | 4 | 4 | 3 | 3 | 2 | 2 | 1 | 1 | 0 |
| 1 | 2 | 2 | 3 | 3 | 4 | 4 | 5 | 6 | 7 | 8 | 9 | 10| 9 | 8 | 7 | 6 | 5 | 4 | 4 | 3 | 3 | 2 | 2 | 1 | 1 | 0 |
| 1 | 2 | 2 | 3 | 3 | 4 | 4 | 5 | 6 | 6 | 7 | 8 | 9 | 8 | 7 | 6 | 5 | 5 | 4 | 3 | 3 | 3 | 2 | 2 | 1 | 1 | 0 |
| 1 | 1 | 2 | 2 | 3 | 3 | 4 | 5 | 5 | 6 | 7 | 7 | 8 | 7 | 7 | 6 | 5 | 5 | 4 | 3 | 3 | 2 | 2 | 1 | 1 | 0 | 0 |
| 1 | 1 | 2 | 2 | 3 | 3 | 4 | 4 | 5 | 5 | 6 | 7 | 6 | 6 | 5 | 5 | 4 | 3 | 3 | 2 | 2 | 1 | 1 | 1 | 1 | 0 | 0 |
| 0 | 1 | 1 | 2 | 2 | 3 | 3 | 4 | 4 | 5 | 5 | 5 | 6 | 6 | 5 | 5 | 5 | 4 | 3 | 3 | 2 | 2 | 1 | 1 | 0 | 0 | 0 |
| 1 | 1 | 1 | 2 | 2 | 3 | 3 | 4 | 4 | 4 | 5 | 5 | 5 | 5 | 5 | 4 | 3 | 3 | 2 | 2 | 1 | 1 | 0 | 0 | 0 | 0 | 0 |
| 1 | 1 | 1 | 1 | 2 | 2 | 3 | 3 | 4 | 4 | 4 | 4 | 4 | 4 | 3 | 3 | 3 | 2 | 2 | 1 | 1 | 0 | 0 | 0 | 0 | 0 | 0 |
| 0 | 1 | 1 | 1 | 1 | 2 | 2 | 3 | 3 | 3 | 4 | 4 | 4 | 3 | 3 | 3 | 2 | 2 | 1 | 1 | 1 | 1 | 0 | 0 | 0 | 0 | 0 |
| 0 | 1 | 1 | 1 | 1 | 2 | 2 | 2 | 3 | 3 | 3 | 3 | 3 | 3 | 2 | 2 | 1 | 1 | 1 | 1 | 1 | 0 | 0 | 0 | 0 | 0 | 0 |
| 0 | 0 | 1 | 1 | 1 | 1 | 1 | 2 | 2 | 2 | 3 | 3 | 3 | 2 | 2 | 1 | 1 | 1 | 1 | 1 | 0 | 0 | 0 | 0 | 0 | 0 | 0 |
| 0 | 0 | 1 | 1 | 1 | 1 | 1 | 1 | 1 | 2 | 2 | 2 | 2 | 2 | 1 | 1 | 1 | 1 | 1 | 0 | 0 | 0 | 0 | 0 | 0 | 0 | 0 |
| 0 | 0 | 0 | 0 | 1 | 1 | 1 | 1 | 1 | 1 | 1 | 2 | 2 | 2 | 1 | 1 | 1 | 1 | 1 | 0 | 0 | 0 | 0 | 0 | 0 | 0 | 0 |
| 0 | 0 | 0 | 0 | 0 | 1 | 1 | 1 | 1 | 1 | 1 | 1 | 1 | 1 | 1 | 1 | 1 | 1 | 0 | 0 | 0 | 0 | 0 | 0 | 0 | 0 | 0 |
| 0 | 0 | 0 | 0 | 0 | 0 | 1 | 1 | 1 | 1 | 1 | 1 | 1 | 1 | 1 | 1 | 0 | 0 | 0 | 0 | 0 | 0 | 0 | 0 | 0 | 0 | 0 |
| 0 | 0 | 0 | 0 | 0 | 0 | 0 | 0 | 0 | 1 | 1 | 1 | 1 | 0 | 0 | 0 | 0 | 0 | 0 | 0 | 0 | 0 | 0 | 0 | 0 | 0 | 0 |

IMAGE FORMING APPARATUS AND METHOD OF PRODUCING LIGHT QUANTITY CORRECTION DATA

BACKGROUND OF THE INVENTION

The present invention relates to a printer, digital copier, facsimile apparatus or similar electrophotographic image forming apparatus including an LED (Light Emitting Diode) array head and a method of producing data for correcting the quantities of light to issue from LEDs arranged on the LED array head.

An LED array head customarily included in an electrophotographic image forming apparatus has a number of LEDs implementing a desired resolution for exposing a photoconductive element. The problem with this kind of head is that a beam profile differs from one LED to another LED. In light of this, it is a common practice to uniform the quantities of light to issue from the LEDs (light quantity correction hereinafter) or to uniform the diameters of dots to be formed on a photoconductive element (diameter correction hereinafter).

For the light quantity correction, a power meter, for example, is used to measure the quantity of light issuing from each LED and increase or decrease a current being fed to the LED. This scheme, however, has the following problems left unsolved. Usually, the variation of the quantity of light to issue form each LED is confined in a range of ±2%. Further, the correction is executed on the basis of the total quantity of light including light in the skirt portions of a beam profile. However, because the beam profile differs from one LED to another LED, the above correction causes the diameter of a beam to differ from one LED to another LED. Particularly, when it comes to a halftone image pattern, the LED array head is apt to form vertical stripes in a developed image because dot areas are not uniform in the image. A laser diode is free from this drawback.

On the other hand, the diameter correction is capable of implementing a uniform dot area in a developed image. This scheme, however, renders the quantities of light to issue from the LEDs irregular and thereby varies image density. It is therefore impossible to reduce the vertical stripes with the diameter correction.

Japanese Patent Laid-Open Publication No. 4-288248, for example, proposes to increase the quantity of light of each LED to the upper limit of the dot diameter, thereby uniforming both the size of the dot diameter and the quantity of light. This, however, increases the dot diameter and cannot implement a sufficient resolution.

SUMMARY OF THE INVENTION

It is therefore an object of the present invention to provide an image forming apparatus capable of reducing the scatter of the dot area of a latent image and the variation of image density while insuring a sufficient resolution of an LED array head, thereby enhancing image quality.

It is another object of the present invention to provide a method of producing data for correcting the quantities of light to issue from the LEDs of an LED array head.

In accordance with the present invention, an electrophotographic image forming apparatus includes a photoconductive element, and an LED array head for electrostatically forming a latent image on the photoconductive element by exposure. A controller controls the LEDs of the LED array head such that they emit a uniform quantity of light above a preselected threshold in a beam profile.

Also, in accordance with the present invention, a method of producing data for correcting the quantity of light includes the steps of measuring quantities of light issuing from the LEDs of an LED head array used to expose a photoconductive element of an electrophotographic image forming apparatus, determining quantities of light to issue from the LEDs such that they emit a uniform quantity of light above a preselected threshold for a single dot, and producing, based on the quantities of light determined, data for controlling the quantities of light to issue from the LED array head.

BRIEF DESCRIPTION OF THE DRAWINGS

The above and other objects, features and advantages of the present invention will become more apparent from the following detailed description taken with the accompanying drawings in which:

FIG. 8 shows an image of data DATAn(x, y) derived from a given LED;

DESCRIPTION OF THE PREFERRED EMBODIMENT

Figure 1:
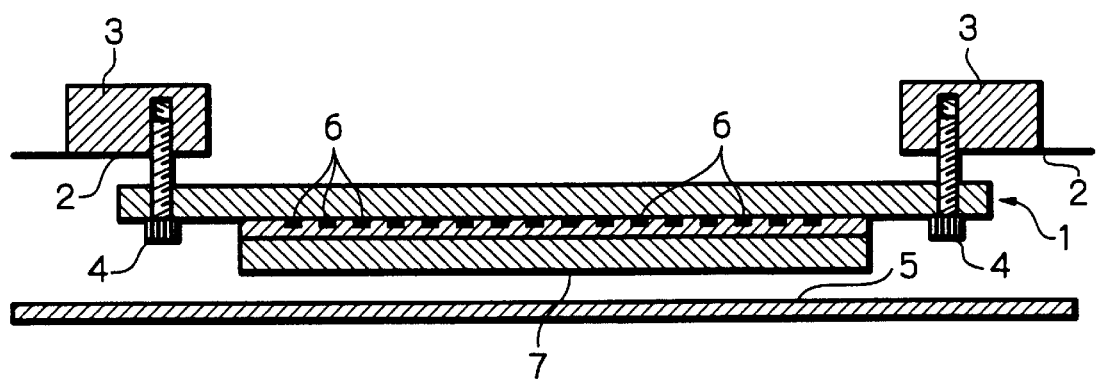
FIG. 1 is a vertical section showing an LED array head included in an image forming apparatus embodying the present invention.

Referring to FIG. 1 of the drawings, an LED array head included in an image forming apparatus embodying the present invention is shown and generally designated by the reference numeral 1. As shown, the LED array head (simply head hereinafter) 1 is adjustably fastened to bases 3 by focus positioning screws 4 at its right and left ends. The bases 3 are affixed to a frame 2 included in the image forming apparatus. One surface of the head 1 faces a photoconductive element 5 and has LEDs 6 arranged in an array thereon. A lens 7 is positioned at the side of the head 1 facing the photoconductive element 5. Beams issuing from the LEDs 6 illuminate the photoconductive element 5 via the lens 7. The head 1 exposes the photoconductive element 5 so as to electrostatically form a latent image thereon.

Conventional electrophotographic process units are arranged in the image forming apparatus, although not shown specifically. The process units includes a charger for uniformly charging the surface of the photoconductive element 5, a developing unit for developing the latent image formed on the element 5 with toner, an image transfer device for transferring the resulting toner image to a paper or similar recording medium, a fixing unit for fixing the toner image on the paper, and a cleaning unit for removing toner left on the element 5 after image transfer.

Figure 2:
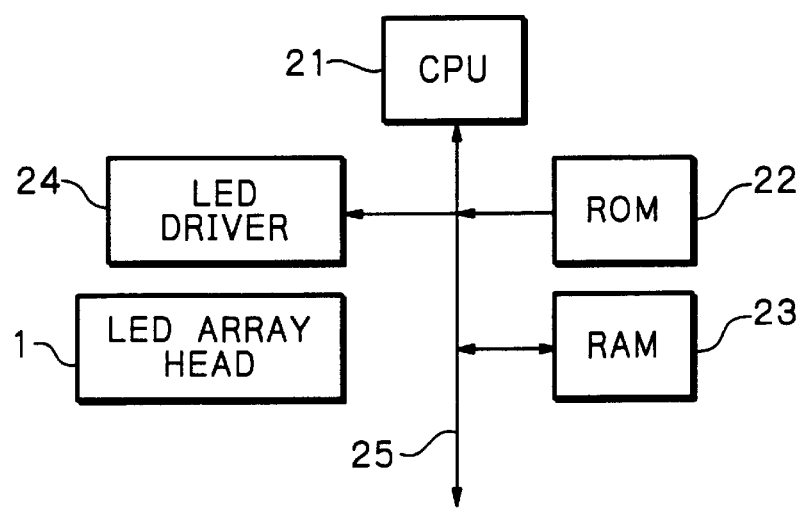
FIG. 2 is a block diagram showing a control system included in the illustrative embodiment.

FIG. 2 shows a control system included in the image forming apparatus. As shown, the control system includes a CPU (Central Processing unit) 21. A ROM (Read Only Memory) 22, a RAM (Random Access Memory) 23, and an LED driver 24 are connected to the CPU 21 by a bus 25. Various sensors and actuators for controlling the conventional process units are connected to the bus 25, although not shown specifically. The ROM 22 stores a program and fixed data for controlling the various sections of the image forming apparatus. In the illustrative embodiment, the ROM 22 additionally stores fixed data for controlling a current to be fed to the individual LED 6.

Figure 3:
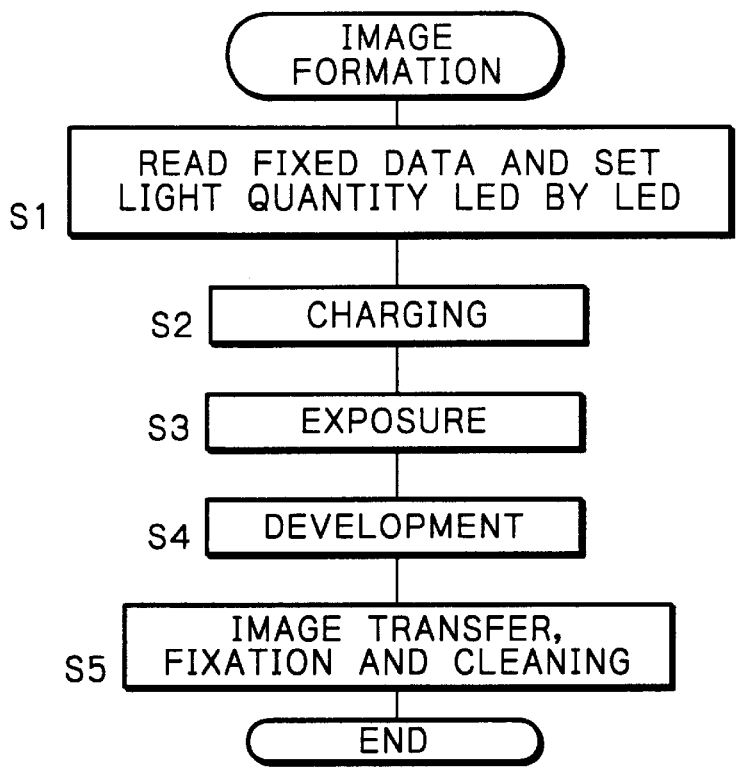
FIG. 3 is a flowchart demonstrating an image forming process particular to the illustrative embodiment.

Reference will be made to FIG. 3 for describing an image forming process to be executed by the image forming apparatus including the above ROM 22. As shown, the CPU 21 reads the fixed data for controlling the current to be fed to the individual LED 6 stored in the ROM 22 and thereby controls the quantity of light to issue from the individual LED 6 (step S1). Then, the CPU 21 controls the charger, developing unit, image transfer device, fixing unit, cleaning unit and other process units for sequentially executing charging (step S2), exposure (step S3), development (step S4), and image transfer, fixation and cleaning (step S5).

Figure 10:
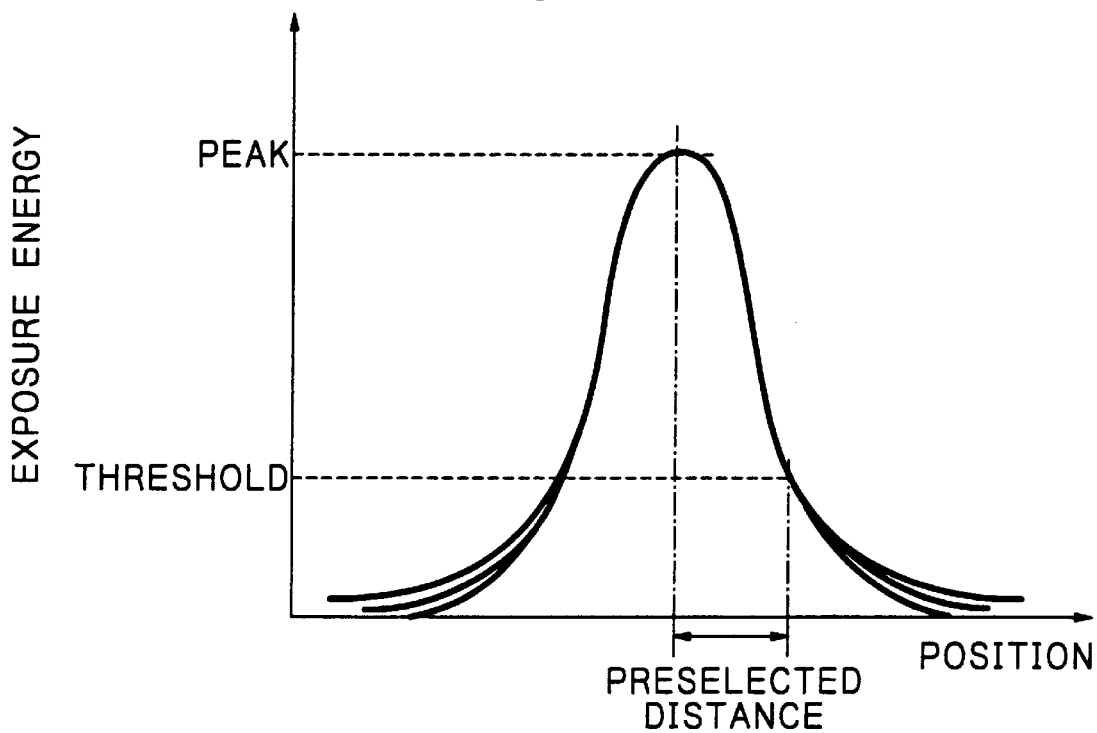
FIG. 10 is a graph showing beam profiles derived from three LEDs.

In the illustrative embodiment, at the time of exposure (step S3), the CPU 21 reads the fixed data stored in the ROM 22 and uniforms quantities of light to issue from all of the LEDs 6 and exceeding a threshold in a beam profile. Specifically, as shown in FIG. 10, the threshold should preferably lie in a range above 10% of a mean peak value of the quantities of light to issue from all of the LEDs 6, but below 40% of the same.

Alternatively, the CPU 21 may uniform the quantities of light to issue from all of the LEDs 6 over a preselected particular width from the center axis of a beam profile. Specifically, the distance from the center axis passing through the peak of the individual LED 6 should preferably be around one half of a mean spot diameter, one half of one side of a single pixel determined by writing density, or one half of a dot diameter as measured on the photoconductive element 5.

With either one of the above control schemes, it is possible to uniform only the quantities of light above the threshold actually contributing to development throughout the LEDs 6, while neglecting the skirt portions of the beam not contributing to development. This successfully reduces the scatter of the area of a dot among the beams to issue form the LEDs 6 and thereby enhances image quality. In addition, such control does not increase the diameter of a dot and guarantees the resolution of the LEDs 6.

Figure 4:
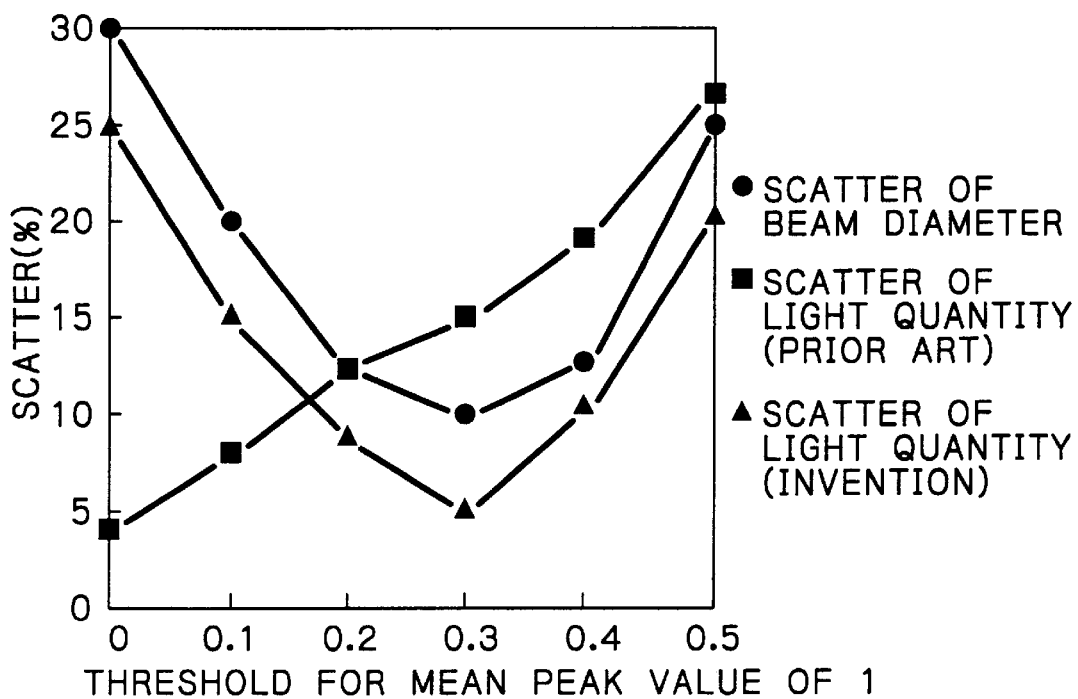
FIG. 4 is a graph showing a relation between a threshold, based on a mean peak value of quantities of light to issue from LEDs which is 1, and the scatter of the diameter of a beam and the scatter of the quantity of light.

Assume that the quantities of light to issue from LEDs 6 have peak values whose mean value is 1. FIG. 4 shows the scatter of the diameter of a beam and the scatter of the quantity of light among the LEDs 6 with respect to various thresholds, as determined in the above condition. It is to be noted that the above scatters each refers to a ratio or percentage of "maximum value–minimum value" of the individual LED 6 to a mean beam diameter or a mean quantity of light of all of the LEDs 6. As for the scatter of the quantity of light, data derived from the illustrative embodiment and data derived from a conventional image forming apparatus are shown for comparison. Also, the quantity of light refers to the total quantity of light above each threshold shown in FIG. 4.

As FIG. 4 indicates, in the illustrative embodiment, the scatter of a beam diameter is minimum when the threshold is about 0.3 with respect to the mean peak value of 1. This means that the scatter among the LEDs is increased at the skirt portions and the head portion of a beam. It has been customary to correct the quantity of light with respect to a threshold of 0 (i.e. the total quantity of light of the beam profile). Such a correction scheme, however, includes even the skirt portions of a beam not contributing to development. This, coupled with the fact that the quantities of light at the skirt portions noticeably differ from one LED 6 to another LED 6, aggravates the scatter of the quantity of light at the thresholds of around 0.1 to 0.4 actually contributing to development. So long as the threshold lies in the range of from 0.1 to 0.4, the scatter of a beam diameter is small and allows the quantity of light to be effectively corrected.

If the threshold lies in the range between 10% and 40% of a mean peak value of the quantities of light to issue from all of the LEDs 6, then both the scatter of the beam diameter and that of the quantity of light can be reduced to a sufficient degree. It is therefore possible to uniform the scatter of the dot area of a latent image to be formed on the photoconductive element 5.

Figure 9:
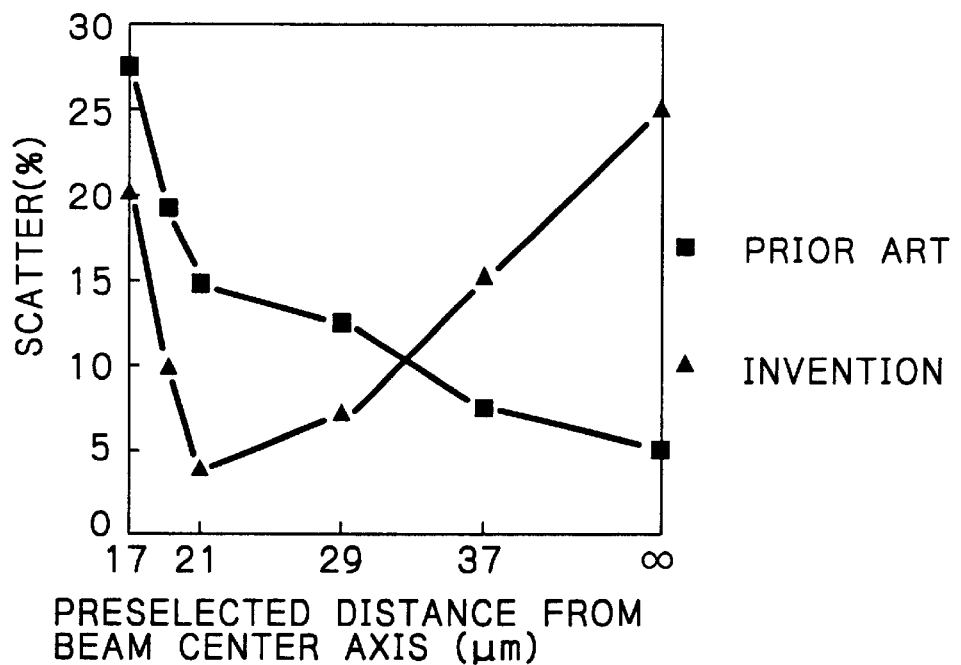
FIG. 9 is a graph showing a relation between a distance from the center axis of the LED and the scatter of the quantity of light.

FIG. 9 shows a relation between the distance from the center axis of the individual LED 6 and the scatter of the quantity of light among the LEDs 6. Again, the scatter refers to a ratio or percentage of "maximum value–minimum value" of each LED 6 to a mean value of the quantities of light to issue from all of the LEDs 6. As for the scatter of the quantity of light, data derived from the correction particular to the illustrative embodiment and data derived from conventional correction are shown for comparison. Also, the quantity of light refers to the total quantity of light within each preselected distance shown in FIG. 9.

As FIG. 9 indicates, it has been customary to correct the quantity of light with respect to an infinite ($\infty$) (i.e., the total quantity of light of a beam profile). Such a correction scheme, however, includes even the skirt portions of s beam not contributing to development. This, coupled with the fact that the scatter of the skirt portions noticeably differs from one LED 6 to another LED 6, aggravates the scatter of the quantity of light at and around 19 $\mu$m to 37 $\mu$m contributing to actual development. It follows that if the quantity of light is corrected in such a manner as to minimize the scatter at and around a preselected distance of 21 $\mu$m, then not only the quantity of light contributing to development can be uniformed, but also the scatter of a beam diameter at such a distance is small.

Therefore, if the preselected distance from the center axis is selected to be less than one half of a mean spot diameter, less than one half of one side of a single pixel, or less than one half of a dot diameter as measured on the photoconductive element 5 throughout the LEDs 6, then the scatter of the quantity of light can be sufficiently reduced. It is therefore possible to more surely uniform the scatter of a dot diameter on the photoconductive element.

The steps S2, S4 and S5 are conventional and will not be described specifically.

Figure 5:
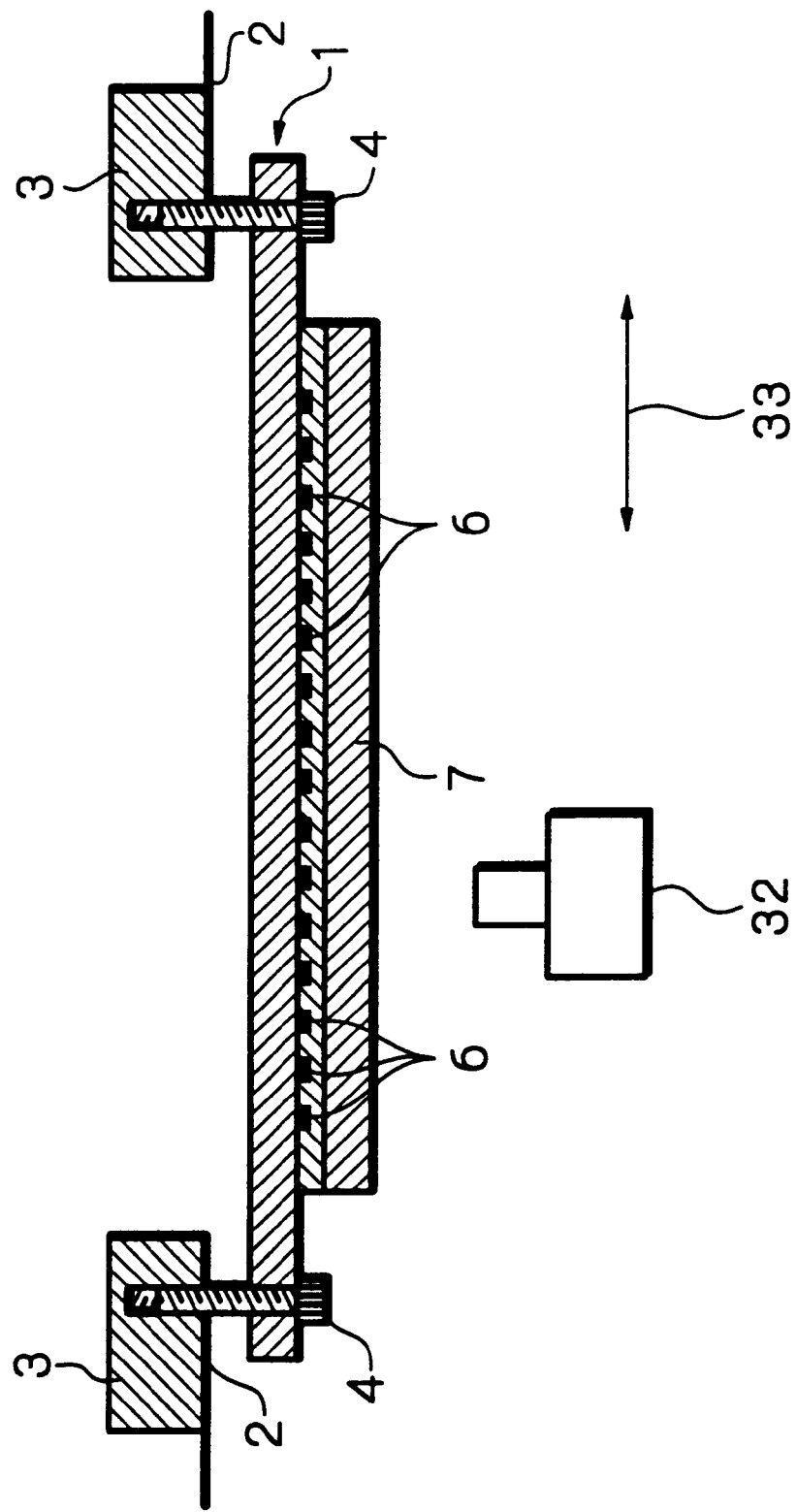
FIG. 5 is a vertical section of a device for measuring the quantity of light to issue from each LED.

A method of producing the fixed data to be stored in the ROM 22 will be described hereinafter. First, as shown in FIG. 5, a measuring device for producing the fixed data is prepared. Specifically, a CCD (Charge Coupled Device) 32 is positioned in front of the lens 7 of the head 1. The CCD 32 should preferably be positioned at the focus of the lens 7, i.e., at a distance equal to the distance between the head 1 and the photoconductive element 5. While the CCD 32 is moved in a direction indicated by an arrow 33, the quantity of light transmitted through the lens 7 is measured LED by LED. The CCD 32 is capable of reading the quantity of light in an area of 1×1 $\mu m^2$ as a minimum unit and outputting bidimensional XY data in the form of DATAn (x, y). The xy integrated value of the DATAn(x, y) is the total quantity of light issuing from a single LED.

An image representative of the bidimensional data DATAn(x, y), i.e., the bidimensional light quantity distribution derived from a single LED 6 is shown in FIG. 8. In FIG. 8, numerals are representative of the intensity levels of the light. In practice, the intensity levels are matched such that the xy integration value of the data DATAn(x, y) of each LED 6 is the total quantity of light.

Figure 6:
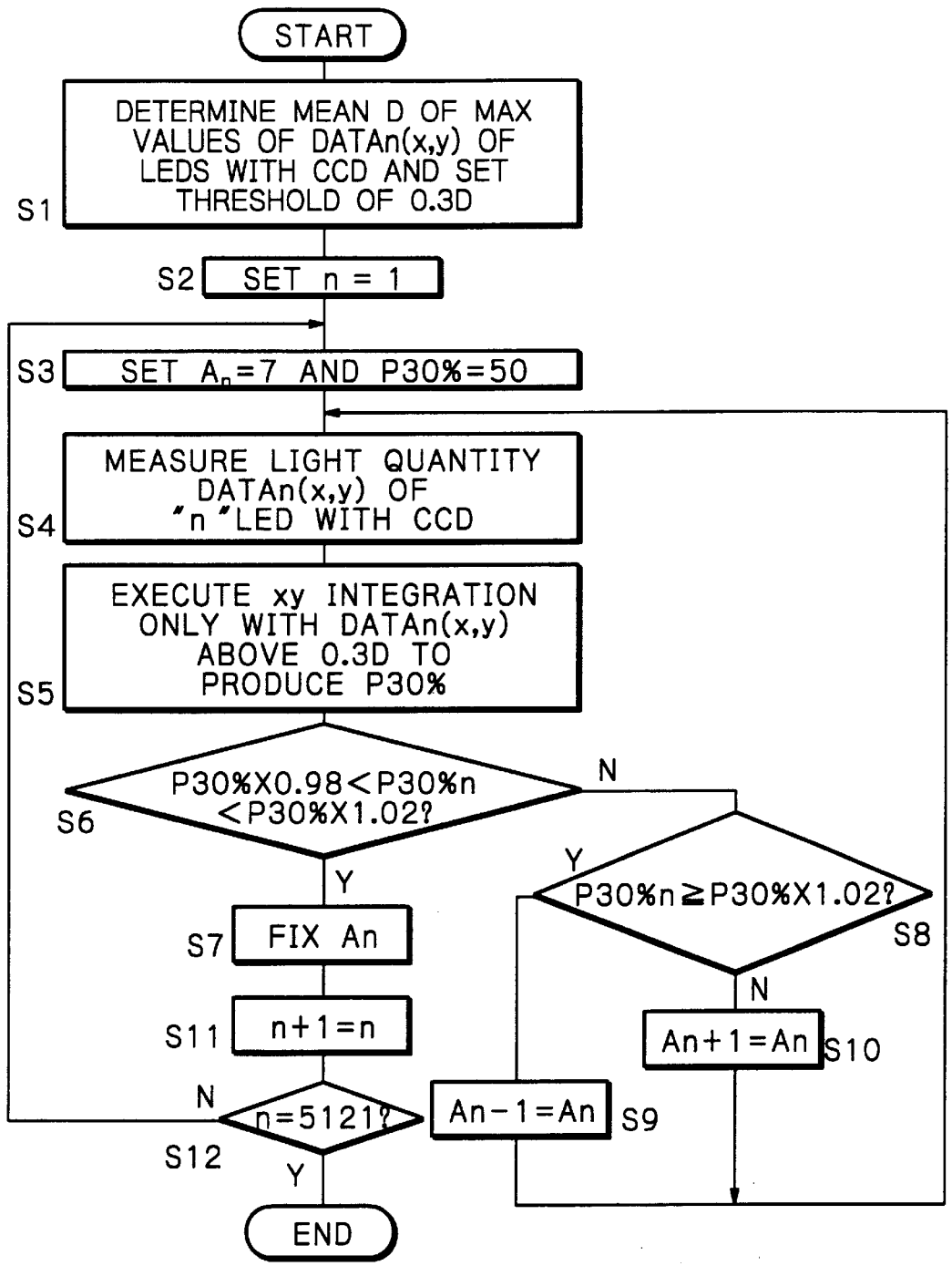
FIGS. 6 and 7 each shows a particular specific procedure for producing fixed data applicable to the image forming process.

Reference will be made to FIG. 6 for describing a specific procedure for producing the fixed data to be stored in the ROM 22. The procedure to be described is executed on the assumption that the head 1 has LEDs #1 through #5, 120 (n=1 through 5, 120). As shown, the procedure begins with the following initialization. First, the data DATAn (x, y) of all of the LEDs 6 are produced via the CCD 32. Then, the mean value D of the maximum values MAX of all of the data DATAn(x, y) is determined. When a threshold of 30% is selected for the peak values of all of the LED 6, a threshold of 0.3D is set. These steps are collectively represented by a step S1. In the illustrative embodiment, a current An to be fed to each LED 6, i.e., for a single dot is adjustable in sixteen consecutive steps (An=1 through 16). Assuming the threshold of 0.3D, then the DATAn(x, y) exceeding 0.3D are subjected to xy integration LED by LED. The result of integration is selected to be 30% n, and a reference value is selected to be P30%.

In the above condition, n=1 (#), An=7 (step) and P30%= 0.5 ($\mu$W) are initially set (steps S2 and S3). Then, the CCD 32 is moved to measure the data DATAn(x, y) of the LED #1 through LED #5, 120 (n) (step S4). The data DATAn(x, y) exceeding the threshold (0.3D) are subjected to xy integration in order to calculate a quantity of light P30%n LED by LED (step S5). This is the end of measurement. Subsequently, whether or not the quantity of light P30%n above the threshold lies in the range of ±2% of the reference value P30% (P30% ×0.98 <30%n <P30%×1.02) is determined (step S6).

If the answer of the step S6 is positive (Y), then the quantity of light P30%n is determined to be allowable, and the current An being fed to the "n" LED is set (step S7). If the answer of the step S6 is negative (N), then the current An is increased or decreased step by step (An−1=An or An+1= An), depending on whether or not the quantity of light P30%n is above or below the above range (steps S8 through S10). This is repeated until the quantity of light P30%n enters the above range (steps S4 through S6 and steps S8 through S10). As a result, the current An to be fed to the "n" LED 6 representative of a dot is determined (step S7).

The above sequence of steps are repeated with each of the LEDs #1 through #5, 120 (steps S11 and S12), thereby determining currents A1 through A5, 120. Finally, data representative of the currents A1 through A5, 120 are written to the ROM 22 as fixed data.

In the above specific procedure, the quantity of light above the threshold is produced in the form of the xy integration value of the data DATAn(x, y) derived from each LED 6 exceeding the threshold. Alternatively, to enhance accuracy, all the data may be replaced with "DATAn (x, y)−threshold=DATAn(x, y) before the xy integration of the data DATAn(x, y).

Figure 7:
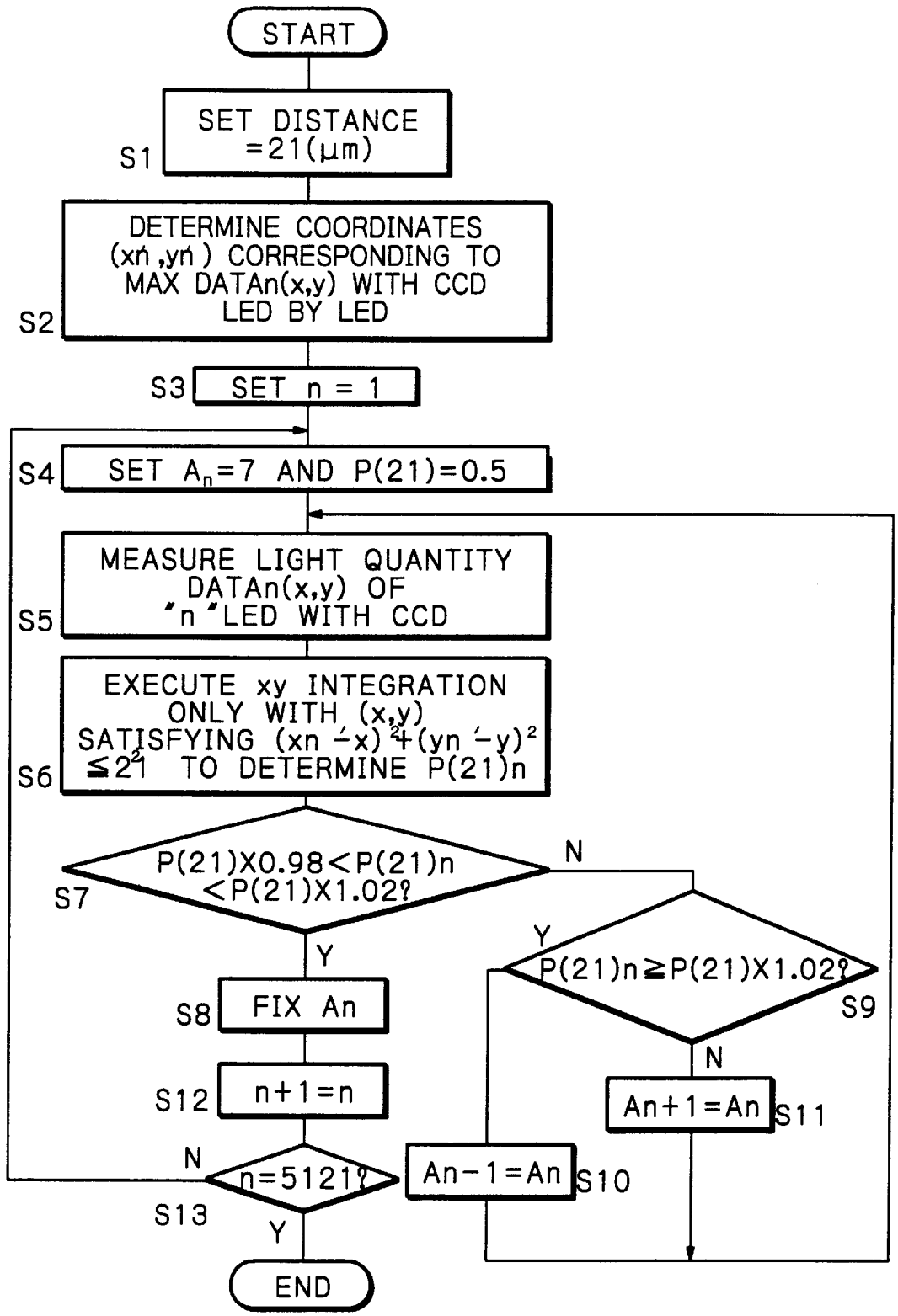

FIG. 7 shows another specific procedure for producing the fixed data to be written to the ROM 22. Briefly, the procedure to be described assumes a preselected distance from a center line passing through the peak of a beam profile and which is one half of one side of a single pixel, and sets up the same quantity of light throughout the LEDs 6. The data DATAn(x, y) of each LED 6 output from the CCD 32 is assumed to have a minimum resolution of 1 $\mu$m.

As shown in FIG. 7, assuming that the head 1 has an optical writing density of 600 dpi, then the preselected distance that is one half of one side of a single pixel is selected to be 21 $\mu$m. Again, the procedure assumes that the head 1 has LEDs #1 through #5, 120 (n=1 through 5, 120). Also, the current An to be fed to each LED 6, i.e., for a single dot is adjustable in sixteen consecutive steps (An=1 through 16). The preselected distance is selected to be 21 $\mu$m, as stated above. These steps are collectively represented by a step S1. Then, the data DATAn(x, y) of all of the LEDs 6 are produced by the CCD 32, and the coordinates of the maximum value (xn', yn') are determined LED by LED (step S2). The coordinates (xn', yn') are assumed to be the coordinates of a centerline passing through the peak of the beam profile of the "n" LED 6.

Subsequently, n=1 (#), An=7 (step) and P(21)=0.5 ($\mu$W) are initially set (steps S32 and S4); P(21) is the reference value of a given quantity of light lying in the range of 21 $\mu$m. After the data DATAn (x, y) has been output by the CCD 32 throughout the LEDs 6 (#1 through #5, 120) (step S5), only the data DATAn(x, y) satisfying a relation of "$(xn'-x)^2+(yn'-y)^2 \leq 21^2$" are subjected to xy integration in order to calculate P(21)n LED by LED (step S6). This is the end of measurement. Whether or not the quantity of light P(21)n within the distance of 21 $\mu$m lies in the range of ±2% of the reference value P(21) is determined (P(21)×0.98<P(21)n <P(21)×1.02) (step S7).

If the answer of the step S7 is Y, then the quantity of light P(21)n is determined to be allowable, and the current An being fed to the "n" LED 6 is set (step S8). If the answer of the step S7 is N, then the current An is increased or decreased step by step, depending on whether P(21)n is above or below the range of ±2% (An−1=An or An+1=An) (steps S9 through S11). This is repeated until P(21)n enters the range of ±2% (steps S5–S7). As a result, the current An to be fed to the "n" LED 6 is determined (step S8).

The above procedure is repeated with all of the LEDs 6 (#1 through #5, 120) (steps S12 and S13) to thereby determine the currents A1 through A5, 120. Data representative of the currents A1 through A5, 120 are written to the ROM 22, as in the previous procedure.

The result of measurement effected with the above head 1 and measuring device will be described with reference to FIG. 4. In FIG. 4, the abscissa indicates the thresholds of the quantity of light for cutting the skirt portions of the beam profile of each LED 6, assuming that the mean peak value of the quantities of light of the LEDs 6 is 1. The ordinate indicates a ratio (%) of a difference between the maximum value (max) and the minimum value (min), i.e., the scatter of each of the quantity of light and beam diameter of each LED 6 to the respective mean value. As for the quantity of light, there are shown both of the conventional correction scheme uniforming the entire quantity of light (minimum scatter at the threshold of 0) and the correction scheme of the illustrative embodiment cutting the skirt portions of a beam profile. It is to be noted that the quantity of light refers to the total quantity of light above each threshold. For the conventional correction scheme, the scatter on the ordinate was selected to be 4%.

As FIG. 4 indicates, the conventional scheme increases the scatter of beam diameter to about 30% due to the noticeable scatter at the skirt portions of a beam profile. This scatter was minimum when the threshold was 0.3. In light of this, when the quantity of light was corrected in such a manner as to minimize the scatter of the quantity of light at the threshold of 0.3, a curve representative of the scatter of the quantity of light shown in FIG. 4 was achieved.

It will be seen that the head 1 is capable of minimizing the scatter of the total quantity of light at thresholds above 0.3 and minimizing the scatter of the beam diameter at the threshold of 0.3. Conversely, in the illustrative embodiment, the scatter of the entire quantity of light, i.e., the scatter of the total quantity of light at thresholds above 0 and having heretofore been minimum increases to 25%.

In summary, an image forming apparatus and a light quantity correction data generating method of the present invention achieve various unprecedented advantages, as enumerated below.

(1) Only the quantity of light that actually contributes to development is uniformed throughout all LEDs of an LED array head. This reduces the scatter of a dot area in a latent image and thereby enhances image quality while insuring the sufficient resolution of the LEDs.

(2) By selecting less than 40% or less than 10% of the mean peak value of the quantities of light issuing from the LEDs as a threshold, it is possible to reduce the scatter of a beam diameter to a sufficient degree. Therefore, the scatter of a dot area in a latent image can be more surely reduced.

(3) There can be produced data for controlling the quantity of light of each LED such that the quantity of light of each LED above the threshold is uniform. This is also successful to achieve the above advantage (1).

(4) The optical energy of the skirt portions of a beam profile not contributing to development is excluded LED by LED, so that the quantity of light making noticeable contribution to development is uniformed throughout the LEDs. This reduces the scatter of a dot area in a latent image, and in addition insures the resolution of the LEDs because the quantity of light does not have to be excessively increased.

(5) A preselected distance is set which is less than one half of a mean spot diameter, less than one half of one side of a single pixel or less than one half of a dot diameter after development. Light at the skirt portions of a beam profile outside of the above distance and involving a noticeable scatter is excluded in order to further reduce the scatter of a dot diameter in a latent image.

Various modifications will become possible for those skilled in the art after receiving the teachings of the present disclosure without departing from the scope thereof.

What is claimed is:

1. An electrophotographic image forming apparatus comprising:
    a photoconductive element;
    an LED (Light Emitting Diode) array head for electrostatically forming a latent image on said photoconductive element by exposure; and
    means for controlling LEDs of said LED array head such that said LEDs emit a uniform quantity of light above a preselected threshold corresponding to the quantity of light that contributes to development.

2. An apparatus as claimed in claim 1, wherein said threshold is above 10%, inclusive, of a mean peak value of quantities of light to issue from all of said LEDs.

3. An apparatus as claimed in claim 1, wherein said threshold is less than 40%, inclusive, of a mean peak value of quantities of light to issue from all of said LEDs.

4. An apparatus as claimed in claim 3, wherein said threshold is above 10%, inclusive, of the mean peak value.

5. A method of producing data for correcting a quantity of light, comprising the steps of:
    measuring quantities of light issuing from LEDs of an LED head array used to expose a photoconductive element of an electrophotographic image forming apparatus;
    determining quantities of light to issue from said LEDs such that said LEDs emit a uniform quantity of light above a preselected threshold corresponding to the quantity of light that contributes to development for a single dot; and
    producing, based on the quantities of light determined, data for controlling the quantities of light to issue from said LED array head.

6. A method as claimed in claim 5, wherein said threshold is above 10%, inclusive, of a mean peak value of quantities of light to issue from all of said LED.

7. A method as claimed in claim 5, wherein said threshold is less than 40%, inclusive, of a mean peak value of quantities of light to issue from all of said LEDs.

8. A method as claimed in claim 7, wherein said threshold is above 10%, inclusive, of the mean peak value.

9. An electrophotographic image forming apparatus comprising:
    a photoconductive element;
    an LED array head configured to electrostatically to form a latent image on said photoconductive element by exposure; and
    means for controlling LEDs of said LED array head such that said LEDs emit a uniform quantity of light when light in skirt portions remote from a center line passing through a peak of a beam profile of an individual LED by a preselected distance are excluded.

10. An apparatus as claimed in claim 9, wherein said preselected distance is less than one half of a mean spot diameter inclusive.

11. An apparatus as claimed in claim 9, wherein said preselected distance is less than one half of one side of a single pixel inclusive.

12. An apparatus as claimed in claim 11, wherein said preselected distance is less than one half a dot diameter inclusive as measured on said photoconductive element after development.

13. A method of producing data for correcting a quantity of light, comprising the steps of:
    measuring quantities of light issuing from LEDs of an LED array head used to expose a photoconductive element of an electrophotographic image forming apparatus, while excluding light in skirt portions remote from a center line passing through a peak of a beam profile of an individual LED by a preselected distance;

determining quantities of light to issue from said LEDs such that said LEDs emit a uniform quantity of light when the light in the skirt portions is excluded; and producing based on the quantities of light determined, data for controlling the quantities of light of said LED array head.

14. An apparatus as claimed in claim 13, wherein said preselected distance is less than one half of a mean spot diameter inclusive.

15. An apparatus as claimed in claim 13, wherein said preselected distance is less than one half of one side of a single pixel inclusive.

16. An apparatus as claimed in claim 13, wherein said preselected distance is less than one half of a dot diameter inclusive as measured on said photoconductive element after development.

* * * * *